July 13, 1965  E. SCHNITZER  3,193,936
GEAR GAGE

Filed April 25, 1963  2 Sheets-Sheet 1

INVENTOR.
ERNST SCHNITZER

BY Arthur L. Collins
ATTORNEY

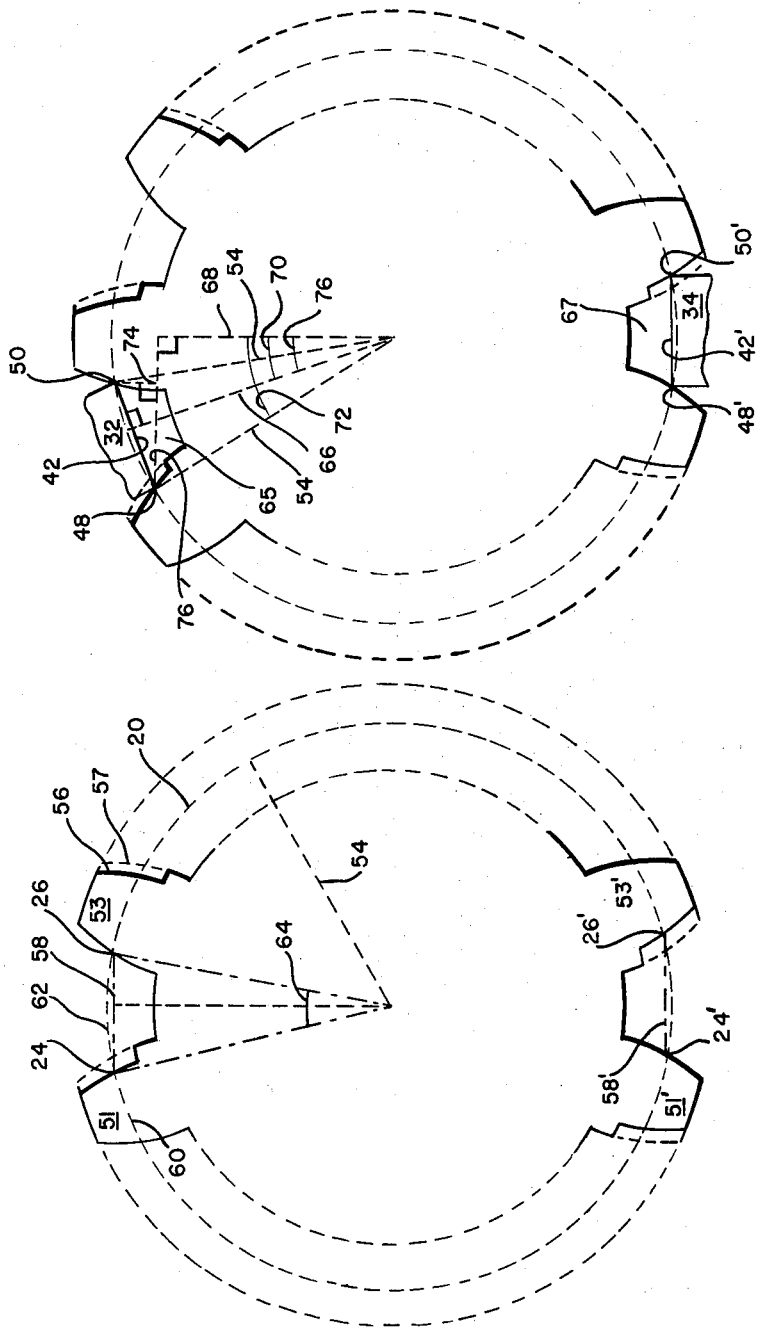

3,193,936
GEAR GAGE
Ernst Schnitzer, Warwick, R.I., assignor to the United States of America as represented by the Secretary of the Navy
Filed Apr. 25, 1963, Ser. No. 276,139
2 Claims. (Cl. 33—168)
(Granted under Title 35, U.S. Code (1952), sec. 266)

The invention described herein may be manufactured and used by or for the Government of the United States of America for governmental purposes without the payment of any royalties thereon or therefor.

This invention relates to gages and particularly those adapted for use on gear teeth.

For proper meshing of teeth on gears, with say, limited backlash, one of the measurements made in line production or inspection of gearing is the gap between teeth, that is the distance from one tooth to an adjacent tooth. Various rulers, feelers, and adjustable measuring devices are utilized.

This invention has as an object the provision of what may be termed a "not-go" feeler gage by which a predetermined measurement may be obtained rapidly, accurately, and with a reduced amount of dependence on the gage operator's skill and especially for gears that have undergone some wear.

Briefly, the invention is a fork-like device having parallelly spaced tines or arms. Each arm has an appropriate width to fit into the gap between teeth and the arms are spaced to span the gear so that gaps on opposite ends of the gear diameter are simultaneously measured.

A clearer understanding and appreciation of the advantages of the invention will be obtained from the following detailed description when read in conjunction with the attached drawing, wherein:

FIGS. 3 and 4 are end elevations of gears with lines added for calculating the gage dimensions.

Figure 1:
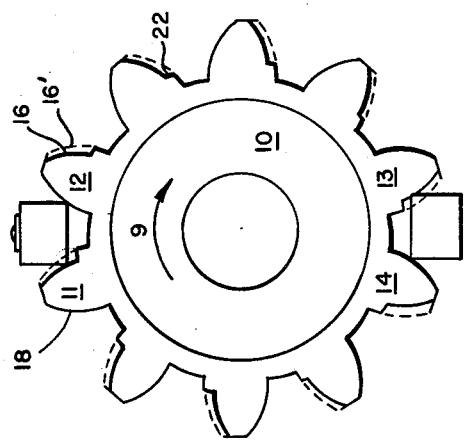
FIG. 1 is an end elevational view of a worn gear with the gage inserted from the opposite end.

Referring to the drawing, in FIG. 1, a gear 10 is shown adapted to be connected for rotation, in the direction of the arrow 9, by a pinion, not shown, of smaller diameter. Gear 10 is of the spur gear type and has a plurality of teeth, some of which are numbered 11 through 14, with the usual involutely curved faces defining the gaps between them. The teeth have undergone wear and this is shown, for example, on tooth 12 by the recession made of the involute face 16 from its original position, indicated by the broken line 16'. The opposite involutely curved faces are unworn and one is indicated at 18. The wear on face 16 extends from the outer tip of the tooth radially inward beyond the pitch circle, shown at 20 in FIG. 3, but not as far as the root of the tooth. As a result, a burr or shoulder 22 is present on the face 16. For operational gear efficiency, the tooth wear should be limited, for instance, to ten percent. The extent of tooth wear is determined by measuring the gap between adjacent teeth with a gage at the points of intersection of the pitch circle with the curved faces or pitch points 24 and 26, FIG. 3.

Figure 2:
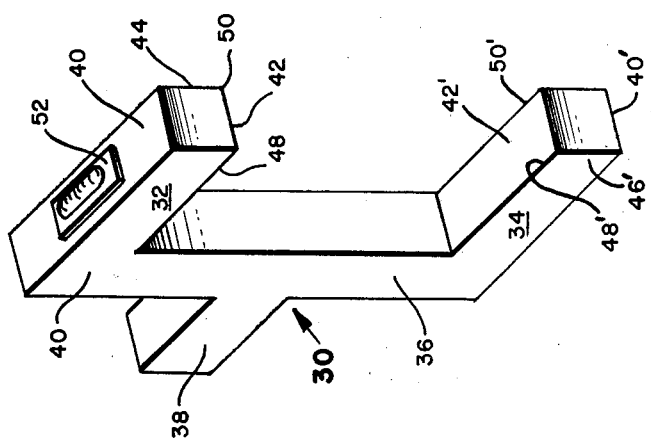
FIG. 2 is a perspective of one embodiment of the gage.

The invention provides a gage, FIG. 2 which is indicated generally by the numeral 30. It has a pair of parallel members or arms, 32 and 34, extending from a plate-like, rectangular base 36. A handle 38 projects from the base 36 in a direction opposite to that of the arms, by which it is held. Each arm is rectangular in cross-section. On arm 32 its surfaces are indicated as an outer surface 40, an inner surface 42, and sides 44 and 46; whereas, those on arm 34 are similarly indicated but the reference characters are primed. The width of the inner surface 42, defined by the edges 48 and 50, or that of inner surface 42', as set off by edges 48' and 50', indicates the maximum allowable gap, after wear, between adjacent teeth of the gear as measured on a chord between the pitch points 24 and 26 or 24' and 26', FIG. 3.

The distance between the gage arms, 32 and 34, that is, between the inner sufaces, 42 and 42', is such that the end of one arm may be inserted between two adjacent teeth on one side of the gear periphery while the end of the other arm is inserted between adjacent teeth on the opposite side or end of the gear diameter, if the teeth are worn beyond the permissible limit, as in FIG. 1.

The gage 30 is inserted by placing it with its arms disposed horizontally, and their ends directed toward an end of the gear, and moving it axially toward the gear. The edges defining the inner surfaces of the arms, at insertion, correlate with the pitch points. The gage is insertable only if the teeth have undergone the predetermined amount of wear.

A bubble level 52, FIG. 2, may be provided on the outer surface of one of the arms, if desired, to assure levelness of the gage during use. However, on involutely curved gear teeth, the shape of the curved surfaces is such that the gage is not insertable by being tilted, and the value of the level in such a case is of doubt.

A method of calculating the width of the gage arms' inner surfaces 42 and 42', which are the same in normal spur gear wear, and the distance separating them is set out with reference to FIG. 3. In this illustration, a standard spur gear is shown with an even number of teeth among which there are two adjacent teeth 51 and 53 on one end and two others, 51' and 53', on the other end of the gear's diameter. The curved surface 56 is worn to the maximum allowable amount from its original position shown by the broken line 57. The pitch circle 20 intersects the teeth at the pitch points 24 and 26 across the gap between teeth 51 and 53 and denotes the maximum permissible chordal width of the gap between teeth. It is the width required of either of the gage's inner surfaces 42 and 42' and includes the allowable tooth wear. In a standard spur gear the length of the tooth thickness arc 60 and the gap arc 62 are equal, and together they represent the circular pitch. The angle subtending the circular pitch is 360° divided by the number of teeth on the gear. Half the angle subtends the gap arc 62. A reduction of the tooth thickness arc 60 by wear increases the gap arc 62, and their subtending angles are similarly affected. The chord 58 representing the gage width, or width of either surface 42 or 42', is twice the pitch radius, 54, multiplied by the sine of half the angle, 64, subtending it.

The distance between the inner faces 42 and 42' of the gage is that between chords 58 and 58', FIG. 3, and is equal to twice the product of the cosine of half the angle 64 by the pitch radius 54.

For spur gears with an odd number of teeth the maximum allowable width of the inner surfaces of the gage, 42 and 42', is determined in the same manner as set out above for gears with an even number of teeth. But since there are no diametrically opposite teeth, or gaps, in determining the distance between the inner surfaces 42 and 42', those gaps most nearly so, as in FIG. 4 the gaps 65 and 67, are used. In this case, the distance between the inner surfaces, 42 and 42', is different at the edges. The distance between edge 48 on arm 32 and edge 48' on arm 34 is equal to the sum of the distances 66 and 68, FIG. 4, where distance 66 is the pitch radius, 54, multiplied by the cosine of the angle 70, the half angle subtending the maximum chordal width of inner faces 42 or 42', and distance 68 is the cosine of angle 72 multiplied by the pitch radius 54. The distance between edge 50 on arm 32 and edge 50' on arm 34, however, is larger by the amount indicated by the distance 74, which is equal to sine of angle 76 multiplied by the maximum allowable chordal width of the gap, that is the width of inner face 42 or 42' in FIG. 4.

Figure 5:
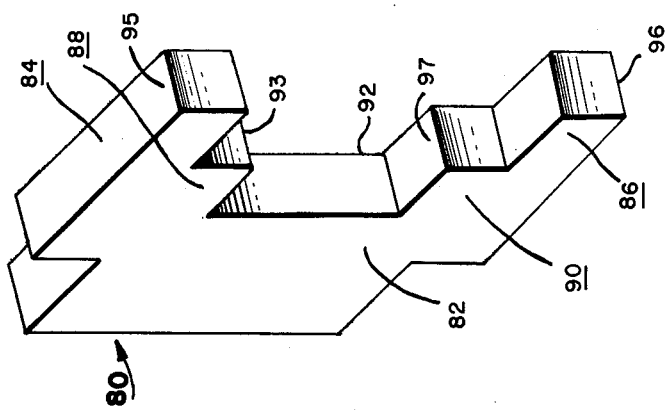
FIG. 5 is a modification of the gage.

In FIG. 5 a modification of the invention is shown. The gage 80 of FIG. 5 is designed to enable checking a gear and its pinion, of smaller diameter, not shown. As in the gage of FIG. 2, heretofore described, the gage 80 has a base 82, two parallel arms, 84 and 86, formed for use on a gear, as in the gage of FIG. 2. A second pair of inner arms 88 and 90 are formed on the gage by a cut-out 92. The inner surfaces 93 and 97 on these arms are calculated to measure the gaps between the teeth on the pinion. Their use is similar to that described with respect to the gage of FIG. 2.

The outer surfaces 95 and 96 may also be designed in the same manner heretofore given with respect to the inner surfaces. In this event, they can be used for checking the wear on teeth of female spline gears, not shown.

While only two preferred embodiments of the present invention have been shown and described, other embodiments are contemplated and numerous changes and modifications may be made without departing from the essence of the invention as set forth in the appended claims.

What is claimed is:

1. A not-go gage comprising a flat base having a recess therethrough forming a pair of spaced arms having opposed parallel inner surfaces, the width of said surfaces corresponding to the chordal width of the gap between adjacent teeth on a first gear at the intersection points of the pitch and with the surfaces of the teeth defining said gap, said surfaces being separated so that one of said arms enters a gap between one pair of adjacent teeth while the end of the other arm enters the gap between substantially diametrically opposed adjacent teeth, said base having a second recess forming a second pair of spaced arms with a second pair of opposed parallel inner surfaces, the width of said second pair of surfaces corresponding to the chordal gap between adjacent teeth of a second gear of smaller diameter than said first gear at the intersection points of the pitch circle and the surfaces of said adjacent teeth defining said gap, said second pair of surfaces being separated so that one of said second pair of arms enters a gap between one pair of adjacent teeth on said second gear while the end of the other member enters the gap between substantially diametrically opposed adjacent teeth thereon.

2. The device of claim 1 including a handle extending from said base in a direction opposite to that of said arms and a bubble level on one of said first pair of arms.

References Cited by the Examiner

UNITED STATES PATENTS

| 1,027,418 | 5/12 | Heide | 33—147 |
| 2,810,198 | 10/57 | Wilson | 33—211 |

FOREIGN PATENTS

| 277,447 | 8/14 | Germany. |
| 544,627 | 4/42 | Great Britain. |

ISAAC LISANN, *Primary Examiner.*